Aug. 16, 1932.　　　J. F. BUHR　　　1,872,400
DRILLING MACHINE
Filed April 17, 1926　　2 Sheets-Sheet 1

Inventor
Joseph F. Buhr
By
Attorneys

Aug. 16, 1932.  J. F. BUHR  1,872,400
DRILLING MACHINE
Filed April 17, 1926  2 Sheets-Sheet 2

Inventor
Joseph F. Buhr.
By
Attorneys

Patented Aug. 16, 1932

1,872,400

UNITED STATES PATENT OFFICE

JOSEPH F. BUHR, OF DETROIT, MICHIGAN

DRILLING MACHINE

Application filed April 17, 1926. Serial No. 102,619.

This invention relates to drilling machines and has special reference to that type of machine wherein a multiple drill head is supported for vertical adjustment relative to a piece of work and is employed for simultaneously providing the piece of work with a plurality of openings, bores or recesses. In this type of drilling machine the multiple drilling head is solely supported by a vertically disposed spindle which is suitably driven for operating the drill head, and the spindle may be raised and lowered.

My invention aims to furnish a drilling machine of the above type with positive and reliable means for bracing the end of the spindle which supports the multiple drill head, and my invention further aims to support the multiple drill head so that it may be bodily rotated or adjusted to properly position the drills relative to a piece of work.

The construction entering into my invention will be hereinafter specifically described and then claimed, and reference will now be had to the drawings, wherein Figure 1 is a front elevation of a portion of a drilling machine in accordance with my invention;

Figure 1:
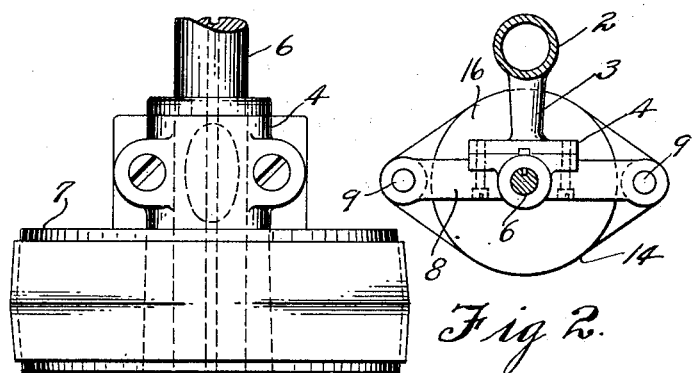
Figure 2:
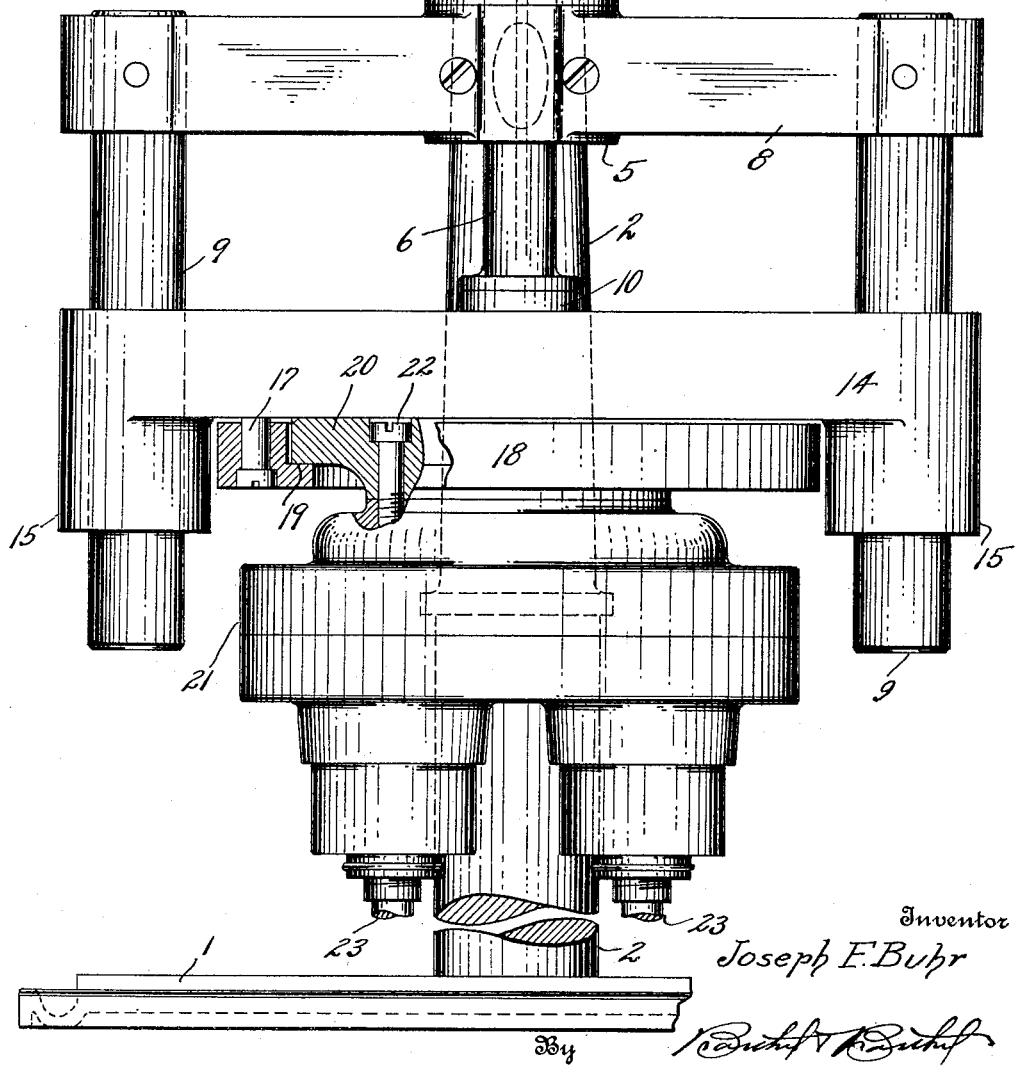
Fig. 2 is a horizontal sectional view, on a smaller scale of a portion of the drilling machine.
Figures 3, 4:
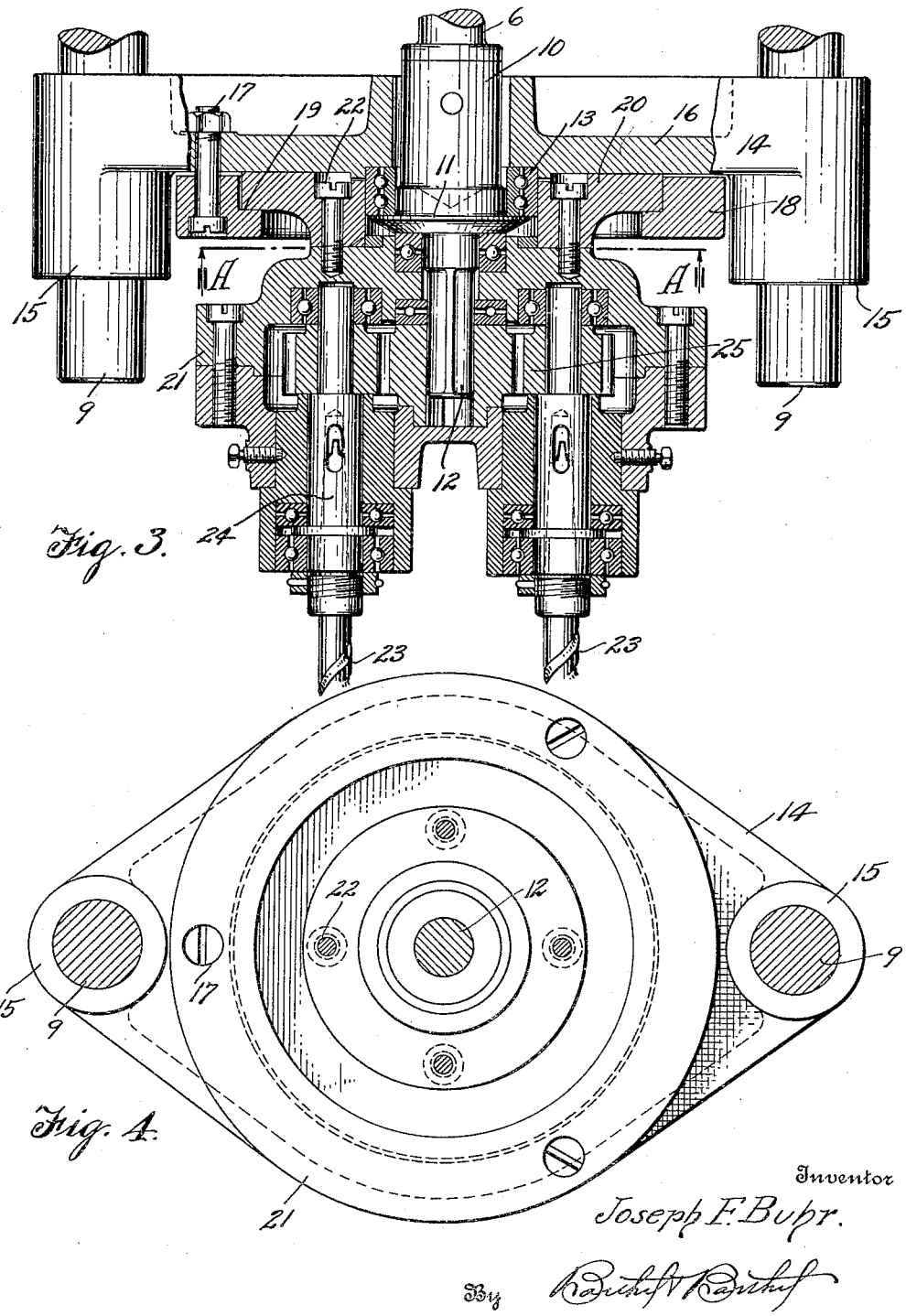
Fig. 3 is a vertical sectional view of a multiple drill head supported in accordance with this invention.
Fig. 4 is a horizontal sectional view taken on the line A—A of Fig. 3.

In the drawings, 1 denotes, by the way of an example, a base supporting an upright portion 2 of a drilling machine and this upright portion has a horizontally disposed forwardly extending bracket, comprising arms 3 provided with bearings 4 and 5 for a vertically disposed driven spindle 6 which may be raised and lowered by suitable mechanism (not shown) commonly used in machines of this character. The bearings 4 and 5 are spaced apart so that a power transmission member 7 may be mounted on the spindle 6 between said bearings to permit of the spindle 6 being driven from a suitable source of power. The bearing 5 supports a transverse member 8 having its ends provided with depending guides 9 and these guides together with the member 8, bearings 4 and arms 3 constitute a stationary bracket supported from a suitable portion of a drilling machine.

On the lower end of the driven rotary spindle 6 is mounted a hub portion 10 of a support 11 and a drill head adapter 12 may extend through the support 11 for a driving connection with the spindle 6 or the adapter 12 may be an integral part of said spindle.

Mounted on the support 11 of the spindle 6 is a radial thrust bearing 13 and this bearing supports a cross head 14 having sleeve ends 15 slidable on the guides 9. The cross head 14 affords a circular head portion 16 and attached thereto by a plurality of nut equipped screws or bolts 17 is a retaining member 18, preferably in the form of a ring having an annular shoulder 19. Seated on the shoulder 19 is a circular head or cap 20 attached to a multiple drill head 21 by screws 22 or other fastening means. The multiple drill head 21 is of a conventional form including a plurality of drills 23 supported by drill sockets 24 with the drills driven by a train of gears 25 driven from the adaptor 12 or the spindle 6. Irrespective of the type of drill head it is bodily supported from the retaining member 19 for adjustment by rotation and after being adjusted in the rotary direction, with the retaining member 18 somewhat loose, said retaining member may be tightened to clamp the cap 20 of the drill head 21 against the cross head 14 to hold the drill head in an adjusted position.

From the foregoing it will be observed that during vertical adjustment of the spindle 6 the cross head 14 may slide on the guides 9 and that during the operation of the multiple drill head it will be firmly braced by the bracket and slidable cross head. It is therefore possible to correctly position the drills 23 relative to a piece of work, and the rotary bodily adjustment of the drill head permits of further adjustment relative to a piece of work.

It is thought that the utility and operation of my improvement will be apparent without further description, and while in the drawings there is illustrated a preferred embodiment of my invention it is to be understood that the structural elements are susceptible to such variations and modifications as fall within the scope of the appended claims.

What I claim is:—

1. In a drilling machine, a bracket, depending guides carried by the ends of said bracket, a rotary and vertically adjustable spindle intermediate the ends of said bracket, a cross head slidable on said guides and supported from said spindle, and a drill head supported from the lower face of said cross head between said guides.

2. In a drilling machine, an upright, bearing arms carried by said upright, an adjustable driven spindle journaled in said bearing arms, a transverse member carried by one of said arms a cross head supported from said spindle below said transverse member, said transverse member and cross head being in a common vertical plane at a right angle to said arms, a drill head supported from said cross head, and means depending from said transverse member and engaged by said cross head to prevent rotation thereof.

3. A drilling machine including an upright, a transverse member supported from said upright, a driven spindle extending through said transverse member, a cross head supported from said spindle and guided from said transverse member, a multi-drill head operatively connected to said spindle, means supporting said drill head for rotary adjustment relative to said cross head, and means articulating said cross head and spindle for simultaneous vertical adjustment relative to said transverse member.

4. In a drilling machine, a base providing a horizontal surface, a vertical standard supported thereby, a bracket extending forwardly from the standard over the said surface, a rotatable and vertically adjustable spindle having a bearing in the bracket, depending rods carried by the bracket, and a drill head supported by the spindle, said head including means slidably engaging the rods to hold the head from rotation.

5. In a drilling machine, a base providing a horizontal surface, a vertical standard supported on one side thereof, a bracket extending forwardly from the standard over the said surface including a pair of spaced bearings, a rotatable and vertically adjustable spindle mounted in the bearings, a driving means secured to the spindle and held from vertical movement with the spindle, a multi-drill head carried by the lower end of the spindle, depending rods on the bracket, and means on the drill head slidable on the rods for maintaining the drill head and spindle in vertical alignment and holding the head from rotation.

In testimony whereof I affix my signature.

JOSEPH F. BUHR.